US009802420B2

(12) United States Patent
Guelck

(10) Patent No.: US 9,802,420 B2
(45) Date of Patent: Oct. 31, 2017

(54) METHOD AND DEVICE FOR DETECTING INK LEAKAGE IN AN INKJET PRINTING MACHINE

(71) Applicant: HEIDELBERGER DRUCKMASCHINEN AG, Heidelberg (DE)

(72) Inventor: Matthias Guelck, Melsdorf (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 15/353,873

(22) Filed: Nov. 17, 2016

(65) Prior Publication Data

US 2017/0144449 A1 May 25, 2017

(30) Foreign Application Priority Data

Nov. 23, 2015 (DE) ........................ 10 2015 223 032

(51) Int. Cl.
*B41J 2/175* (2006.01)
*G01F 23/22* (2006.01)
*G01F 23/26* (2006.01)

(52) U.S. Cl.
CPC .......... *B41J 2/17566* (2013.01); *B41J 2/175* (2013.01); *B41J 2/17503* (2013.01); *G01F 23/22* (2013.01); *G01F 23/26* (2013.01); *B41J 2002/17569* (2013.01)

(58) Field of Classification Search
CPC .... B41J 2/175; B41J 2/17503; B41J 2/17566; B41J 2202/17569; G01F 23/22; G01F 23/26
See application file for complete search history.

(56) References Cited

U.S. PATENT DOCUMENTS 5,929,885 A * 7/1999 Nakajima ............ B41J 2/17566
347/7
6,151,039 A * 11/2000 Hmelar ................ B41J 2/17546
347/7

(Continued)

FOREIGN PATENT DOCUMENTS

CN 103593559 A 2/2014
DE 19754663 A1 6/1998
DE 10332319 A1 2/2004

*Primary Examiner* — Anh T. N. Vo
(74) *Attorney, Agent, or Firm* — Laurence A. Greenberg; Werner H. Stemer; Ralph E. Locher

(57) ABSTRACT

A method and a device for detecting ink leakage during a printing process are used in an inkjet printing machine including a workflow system on a computer for print job control, an ink supply unit including an ink reservoir with an ink level sensor, a control unit running software for controlling the ink supply and print heads capable of creating ink drops of different sizes. A theoretical amount of ink to be consumed is calculated based on prepress printing data by adding drop volumes using the workflow system. The theoretical amount to be consumed is transmitted to the ink supply control software using the workflow system. An actual amount of ink having been consumed is detected by the ink level sensor. The theoretical ink consumption amount and the actual ink consumption amount are compared and a leakage alert is displayed if the actual amount is greater than the theoretical amount.

10 Claims, 2 Drawing Sheets

(56) References Cited

U.S. PATENT DOCUMENTS

| | | | |
|---|---|---|---|
| 6,293,645 B1* | 9/2001 | Kim | B41J 2/16579 |
| | | | 347/19 |
| 6,312,073 B1* | 11/2001 | Inora | B41J 2/1652 |
| | | | 347/19 |
| 6,402,277 B1 | 6/2002 | Monclus et al. | |
| 6,648,434 B2* | 11/2003 | Walker | B41J 2/17509 |
| | | | 347/7 |
| 6,802,581 B2 | 10/2004 | Hasseler et al. | |
| 6,966,622 B2* | 11/2005 | Dodd | B41J 2/17503 |
| | | | 347/19 |
| 2005/0128230 A1 | 6/2005 | Chelvayohan | |

\* cited by examiner

METHOD AND DEVICE FOR DETECTING INK LEAKAGE IN AN INKJET PRINTING MACHINE

CROSS-REFERENCE TO RELATED APPLICATION

This application claims the priority, under 35 U.S.C. §119, of German Patent Application DE 10 2015 223 032.5, filed Nov. 23, 2015; the prior application is herewith incorporated by reference in its entirety.

BACKGROUND OF THE INVENTION

Field of the Invention

The present invention relates to a method and a device for detecting ink leakage during a printing process in inkjet printing machines.

The technical field of the invention is the field of inkjet printing.

The printing industry uses various printing processes. Offset printing, a lithographic printing process, continues to be the most common printing process for mass-producing printed products. That printing process is implemented in a substrate-dependent way in sheet-fed offset printing machines that print on sheets or in web-fed offset printing machines that print on a web-shaped printing substrate.

In the past few years, so-called digital printing has become more and more important, supplementing traditional offset printing in the printing industry. The term "digital printing" is used as a generic term for various printing processes which have one thing in common: it is the process itself, not merely prepress operations or the machine carrying out the printing process, for instance, that are implemented in an electronically controlled way. In that context, an important process apart from laser printing, which is an electronically implemented planographic printing process, is inkjet printing. Inkjet printing, in particular, has become capable of obtaining results that are on a par with those of traditional offset printing. Having conquered the field of private homes and offices years ago, inkjet printing and laser printing are now becoming increasingly popular in the printing industry. Like all digital printing processes, inkjet printing has considerable advantages over traditional offset printing in terms of flexibility and efficiency since printing plates no longer need to be created. In inkjet printing, the printed image is created by one or more print heads that include a plurality of tiny printing nozzles for applying ink to the printing substrate. Consequently, the application, transport and storing of the inks that are used are crucial aspects. In that context, particular importance is attached to ensuring that there is no undesired ink leakage over the entire process chain from ink storage through transport to the print heads. Depending on the location where it occurs, such a leakage would have very undesirable effects. Those may include simply an increased consumption of ink, but also higher maintenance costs and, if the leakage occurs in the vicinity of the printing substrate, more waste and even a failure of the entire printing machine.

Thus, checking the printing machine for potential ink leakage in the ink supply is an important aspect in the operation of an inkjet printing machine.

Various approaches to leakage control in inkjet printing machines are known in the art. The most common approach is to provide various leakage sensors in the leakage-sensitive areas of the printing machine. U.S. Pat. No. 6,402,277 B1 discloses the provision of sensors for leakage control in specific areas of the inkjet printing machine. The sensors are formed of a small ink collection container. Two small power-conducting electrical conductors are disposed to be spaced apart from one another in the ink collection container. If there is an undesired ink leakage at the location of the sensor, the electrically conductive ink will collect in the collection container, closing the circuit between the two spaced-apart conductors. Thus, the sensor circuit will detect the undesired presence of ink and the conclusion that a leakage has occurred may be drawn.

The provision of sensors is thus a reliable method of the prior art with the additional advantage of broadly narrowing down the location where the ink leakage has occurred. A disadvantage of leakage detection by sensors is, however, that the provision of sensors in the inkjet printing machine is complicated and costly and that the sensor results need to be checked and monitored. In addition, sensors may fail, for instance when the collection container of the sensor in question is not cleaned, allowing the ink to dry and cover the two conductors, effectively preventing newly leaking ink from closing the circuit between the two conductors.

In order to avoid those disadvantages of a sensor-based detection process, the implementation of a method that does not require the mounting and operation of leakage sensors would be extremely desirable.

An important step towards that goal is to calculate the approximate ink consumption of the printing machine. For that purpose, German Patent Application DE 197 54 663 A1, corresponding to U.S. Pat. No. 6,312,073, discloses a method for calculating the remaining amount of ink in inkjet printers wherein the remaining amount of ink is calculated by adding up the amount of ink that has been consumed while the amount of ink that is present is known. In that process, the periodically implemented printing nozzle cleaning process is used to extrapolate the total amount of ink that has been consumed. Since the cleaning process occurs in an automated way once a specific amount of ink has flown through and since the number of printing nozzles is known, an approximate total consumption may be extrapolated when the cleaning processes are recorded.

Another method for calculating ink consumption in inkjet printing machines is known from Chinese Patent Application CN 10 359 35 59 A. That document discloses a method for calculating ink consumption by forecasting the ink layer thickness on the printing substrate while the region to be printed on all pages to be printed is known, allowing the ink consumption for a print job that is yet to be carried out to be forecast. The aim of that process is to calculate the amount of ink required for and the cost of the current print job. In contrast to the method for calculating the remaining amount of ink in accordance with German Patent Application DE 197 54 663 A1, corresponding to U.S. Pat. No. 6,312,073, the process described in the Chinese document does not measure or calculate ink consumption during an ongoing operation but makes a forecast prior to the initiation of the print job on the basis of the image to be printed.

That method known from the prior art thus allows the consumption of an inkjet printing machine to be calculated or forecast, but does not provide leakage control without the use of sensors for leakage detection.

SUMMARY OF THE INVENTION

It is accordingly an object of the invention to provide a method and a device for detecting ink leakage in an ink supply of an inkjet printing machine, which overcomes the hereinafore-mentioned disadvantages of the heretofore-known methods and devices of this general type in an efficient, cost-effective way and without the use of additional hardware.

With the foregoing and other objects in view there is provided, in accordance with the invention, a method for detecting ink leakage during a printing process in an inkjet printing machine.

The method is a method for detecting ink leakage during a printing process in an inkjet printing machine including a workflow system on a computer for controlling the print job, an ink supply unit for the printing machine, the ink supply unit including an ink reservoir with an ink level sensor, and a control unit running software for controlling the ink supply unit, wherein the print heads are capable of creating ink drops of different sizes. The method comprising the steps of:
1. calculating a theoretical amount of ink that will be consumed, based on prepress printing data, by adding up the drop volumes by using the workflow system,
2. transmitting the theoretical amount of ink that will be consumed to the software for controlling the supply of ink by using the workflow system,
3. detecting an actual amount of ink that has been consumed by analyzing the ink level sensor in the ink reservoir,
4. comparing the theoretical amount of ink that will be consumed and the detected actual amount of ink that has been consumed, and
5. displaying a leakage alert if the actual amount of ink that has been consumed is greater than the theoretical amount of ink that will be consumed.

The fundamental principle of the present invention is that as a print job is being processed, the measured actual ink consumption is compared to a theoretical ink consumption that has been calculated prior to the initiation of the print job. If the actual ink consumption is considerably higher than the theoretical ink consumption calculated in advance, the presence of a leak in the ink supply may be assumed. The theoretical ink consumption is calculated in the prepress department, namely by the computer that runs the workflow program for monitoring the preparation and implementation of the print job. The printing data, the number of print sheets or pages, and information on the inks that are used are required for this calculation. These data allow an approximate ink consumption for the print job to be calculated as is known in the art. Then the COMPUTER running the workflow system sends the theoretical consumption value to the inkjet printing machine, namely the control unit that is in charge of controlling the ink supply. Based on the ink level indication on the ink reservoir, the control unit may calculate the actual amount of ink that has been consumed for the print job and may detect and indicate a leakage alert in the case of a deviation from the theoretical ink consumption value.

Advantageous and thus preferred further developments of the method will become apparent from the associated dependent claims and from the description with the associated drawings.

A preferred further development of the invention is that when a leakage alert is indicated, specific measures are taken against the detected leakage. When the system detects a leakage, immediate measures are initiated to prevent subsequent damage to the printing machine. These measures may involve an immediate stoppage of all pumps in the ink supply to prevent more ink from leaking. Usually this also involves stopping the current print job.

Another preferred further development of the method of the invention is that the theoretical amount of ink that will be consumed is calculated by the workflow system for every print page of the current printing operation. The calculation of the minimum amount that will theoretically be consumed for a single print page or sheet and the transmission of this information to the ink supply control are required in order for a leakage to be detected during the printing operation and not as late as at the end of the print job.

Another preferred further development of the method of the invention is that the workflow system adds up the drop volumes of a number of print pages to a defined theoretical minimum consumption. Since a periodical comparison between the actual ink consumption and the calculated theoretical ink consumption is required for the aforementioned continuous ink leakage monitoring process, a fact that needs to be taken into account is that the ink level sensor may reliably detect only a specific minimum amount of ink. Due to this limitation of the ink level sensor, a reliable comparison between theoretical and actual ink consumption may only be carried out for a specific minimum amount of ink. In order to ensure a comparison of this specific minimum amount, the amount of ink that is required to print a print page needs to be added up for multiple print pages until the minimum ink amount is reached that the ink level sensor in the ink supply system is capable of detecting. Then the workflow system transmits this minimum consumption that has been added up to the ink supply control software, which may then calculate whether the actual consumption exceeds the calculated consumption once the added-up print pages or sheets have been printed to find out whether a leakage has occurred.

In accordance with another preferred further development of the method of the invention, the workflow system sends a synchronization signal to the software for controlling the ink supply to start a new measurement cycle and a second synchronization signal to end the new measurement cycle once the predetermined theoretical minimum amount has been consumed.

In order to synchronize the method described above in a sensible way, the workflow system sends a synchronization signal to the ink supply control software. Once the pages required to attain the minimum ink consumption have been sent to the inkjet printing machine and printed, the workflow system sends a second synchronization signal to the ink supply control software to terminate the measurement cycle. Thus based on the ink level at the beginning of the synchronization signal and on the ink level at any given point in the measurement cycle, the control software may calculate the actual consumption and compare it to the calculated theoretical ink consumption for the number of print pages as provided by the workflow system. If the actual ink consumption is greater than the calculated theoretical ink consumption during the measurement cycle or until the end of the measurement cycle, a leakage may be assumed.

Another preferred further development of the method of the invention is that the actual ink consumption is calculated during the measurement cycle by calculating the difference between a current measured ink level in the ink reservoir and an ink level in the ink reservoir that was saved at the beginning of the new measurement cycle.

Another preferred further development of the method of the invention is that a leakage alarm is displayed only when the actual ink consumption exceeds the theoretical ink consumption by a predefined tolerance. Since both the calculation of a theoretical ink consumption and the measured value of the actual ink consumption are subject to certain fluctuations during a measurement cycle, these values may never be precisely identical. Therefore it makes sense to establish tolerances and to display a leakage alert only when these tolerances are exceeded.

Another preferred further development of the method of the invention is that the specific measures taken against a detected leakage include stopping all ink pumps in the inkjet printing machine.

With the objects of the invention in view there is concomitantly provided a device for detecting ink leakage in an inkjet printing machine, comprising a workflow system installed on a computer for controlling a print job, an ink supply unit for the printing machine, the ink supply unit including an ink reservoir with an ink level sensor, and a control unit running software for controlling the ink supply unit and being equipped to implement the method according to the invention. The workflow system is equipped to calculate a theoretical ink consumption for a given amount of time based on the image data in the prepress department and to send this value to the control unit of the ink supply unit, the control unit of the ink supply unit detects the actual ink consumption for this period of time, and the control unit of the ink supply unit is equipped to compare these two values and to initiate a leakage alert when a difference is found. This device allows the implementation of the methods for detecting ink leakages in an inkjet printing machine as described above.

Other features which are considered as characteristic for the invention are set forth in the appended claims.

Although the invention is illustrated and described herein as embodied in a method and a device for detecting ink leakage in an inkjet printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
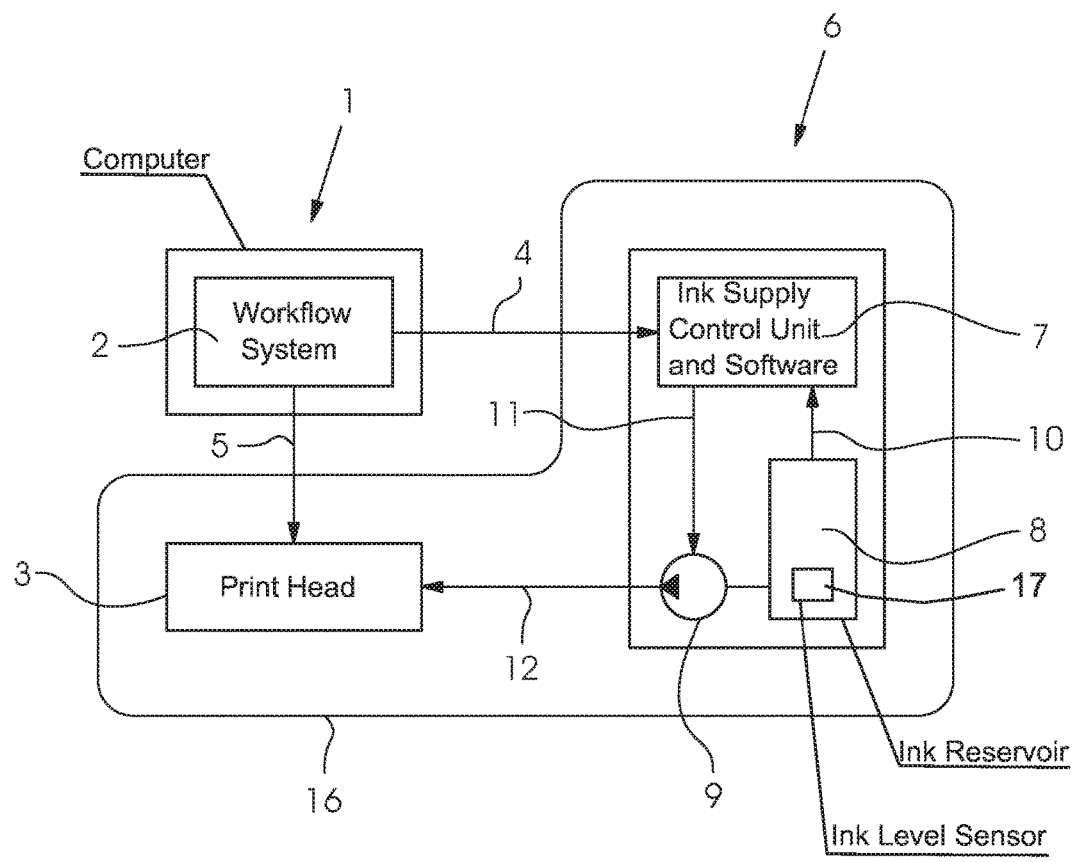
FIG. 1 is a schematic representation of a configuration of a device for detecting ink leakage.

Referring now in detail to the figures of the drawings, in which identical reference symbols identify identical elements, and first, particularly, to FIG. 1 thereof, there is seen a preferred configuration of the device according to the invention. The main element of the device is a computer 1 running image creation software 2, which corresponds to a workflow system 2 for carrying out a print job. Messages are sent to an inkjet printing machine 16 through the use of the image creation software 2. On one hand, these messages include actual print data 5 that are sent to print heads 3 of the inkjet printing machine 16. On the other hand, they include a calculated theoretical ink consumption 13 and synchronization signals 4 that are sent to an ink supply 6 or, to be more precise, to ink supply control unit software 7. The ink supply 6 is formed of a computer, which may be present in an integrated form, that operates the software 7 for controlling the ink supply. In addition, the ink supply 6 contains an ink reservoir 8 that has an ink level sensor 17 communicating with the software 7 for controlling the ink supply. In addition, the ink supply control software 7 controls pumps 9 for feeding ink 12 to the print heads 3 by using an ink pump actuation 11.

Figure 2:
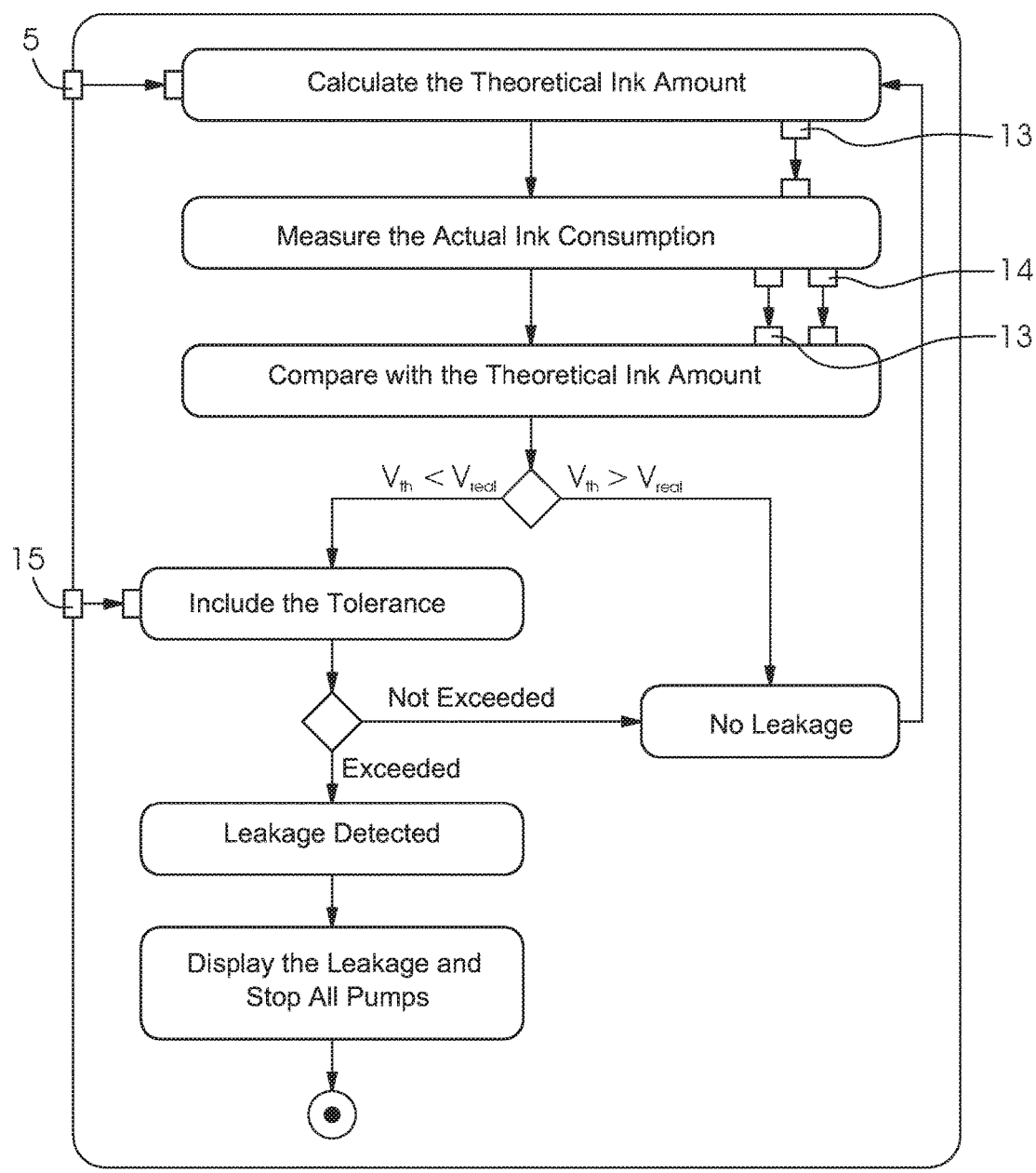
FIG. 2 is a flow chart of the method of the invention for detecting ink leakage.

The fundamental steps of the method of the invention are illustrated in a schematic way in FIG. 2.

In order to provide high-quality printing on an inkjet printing machine 16, the individual image dots are printed in gray scales to provide fine color gradations. These gray scales are created by ink drops of different sizes and comparatively well-known volumes, which are calculated by the image creation software 2 on the computer 1. The software 2 sends the image dot data 5 to the print heads 3 of the printing machine 16 and is thus capable of calculating the theoretical ink consumption 13 for every printed image by adding up the drop volumes. The ink supply unit 6 pumps the ink 12 to the print heads 3. The image creation software 2 may send messages 4 to the ink supply control software 7 over a communication link.

Since the measurement of the actual ink consumption 14 by the ink supply control software 7 is only accurate with a justifiable effort within a range of several milliliters, the image creation software 2 needs to add up drop volumes of a number of printed images until a predefined theoretical ink consumption 13, for instance 50 ml, is reached. This ink consumption 13 is transmitted to the ink supply control software 7 in the message 4.

In order to synchronize the measurement, the image creation software 2 sends a message 4 to the ink supply control software 7 when a new measurement cycle has been started. The ink supply control software 7 records the ink level 10 in the ink reservoir 8 at this instant.

Once the image creation software 2 has calculated that the predefined theoretical ink consumption has been reached, a new message 4 is sent to the ink supply control software 7 to end the measurement cycle.

Periodically, i.e. at defined intervals, the ink supply control software 7 calculates the actual ink consumption 14 based on the ink level 10 in the ink reservoir 8 during the measurement cycle and based on the recorded ink level 10 at the beginning of the measurement cycle. Then the ink supply control software 7 compares this consumption value 14 to the previously transmitted theoretical ink consumption 13. If the actual ink consumption 14 is greater, a leakage in the ink supply may be assumed.

Since the actual ink consumption 14 will hardly ever be identical with the pre-calculated theoretical ink consumption 13, a tolerance 15 needs to be defined by which the two values 13, 14 may differ from one another.

This, in particular, applies to an actual ink consumption 14 that is much higher. This is because if the actual consumption 14 before or at the instant of the reception of the second synchronization message is greater than the theoretical consumption 13 minus the tolerance 15, an unexpectedly large amount of ink 12 has been consumed.

Thus, the following rule applies:

$$V_{real} - V_{th} > V_{Tol}$$

That is, the actual volume minus the theoretical volume is greater than the tolerance volume.

Such an unexpectedly high ink consumption 14 thus indicates a leakage in the ink system 6. If the tolerance has been exceeded, a leakage alert is displayed and all of the pumps 9 in the ink supply 6 are stopped to prevent further ink 12 from leaking.

It is to be understood that at the same time, the opposite scenario may likewise be covered. If, for instance, the theoretical consumption 13 is greater than the actual consumption 14 minus the tolerance 15, too little ink 12 has been consumed.

In accordance with the rule:

$$V_{th}-V_{real}>V_{Tol}$$

That is, the theoretical volume minus the actual volume is greater than the tolerance volume.

This may be caused by a defective print head 3. Such a defect may likewise be displayed by using the system of the invention. However, in contrast to an ink leakage scenario, this scenario may have a number of reasons, making an accurate identification of the defect difficult for such a result.

The invention claimed is:

1. A method for detecting ink leakage during a printing process in an inkjet printing machine, the method comprising the following steps:
   providing a computer executing a workflow system for controlling a print job;
   providing an ink supply for the printing machine, the ink supply including an ink reservoir with an ink level sensor and a control unit executing software for controlling the ink supply;
   providing print heads for the printing machine capable of creating ink drops of different sizes;
   calculating a theoretical amount of ink to be consumed by adding up drop volumes based on prepress print data by using the workflow system;
   transmitting the theoretical amount of ink to be consumed to the software for controlling the ink supply by using the workflow system;
   detecting an actual amount of ink having been consumed by analysis of the ink level sensor of the ink reservoir;
   comparing the theoretical ink consumption to the detected actual amount of ink having been consumed; and
   displaying a leakage alert if the actual ink consumption is greater than the theoretical ink consumption.

2. The method according to claim 1, which further comprises initiating measures against the leakage when the leakage alert occurs.

3. The method according to claim 1, which further comprises using the workflow system to calculate the theoretical ink consumption for every print page of a current printing operation.

4. The method according to claim 3, which further comprises using the workflow system to add up the drop volumes of a plurality of print pages until a predefined minimum theoretical ink consumption is reached.

5. The method according to claim 4, which further comprises:
   using the workflow system to send a first synchronization signal to the software for controlling the ink supply to start a new measurement cycle; and
   using the workflow system to send a second synchronization signal to end the new measurement cycle once the predefined minimum theoretical ink consumption has been reached.

6. The method according to claim 5, which further comprises calculating the actual ink consumption during the measurement cycle by calculating a difference between a current measured fill level of the ink reservoir and a recorded fill level in the ink reservoir at a beginning of the new measurement cycle.

7. The method according to claim 1, which further comprises displaying the leakage alert only if the actual ink consumption exceeds the theoretical ink consumption by a predefined tolerance.

8. The method according to claim 2, wherein the measures initiated against the detected leakage include stopping all ink pumps in the inkjet printing machine.

9. A device for detecting ink leakage in an inkjet printing machine, the device comprising:
   a computer executing a workflow system for controlling a print job;
   an ink supply for the printing machine, said ink supply including an ink reservoir with an ink level sensor and a control unit executing ink supply control software;
   said workflow system being configured to calculate a value of a theoretical ink consumption for a period of time based on prepress image data and being configured to transmit said value of said theoretical ink consumption to said control unit of said ink supply;
   said control unit of said ink supply detecting a value of an actual ink consumption for said period of time aided by said ink level sensor in said ink reservoir; and
   said control unit of said ink supply being configured to compare said value of said theoretical ink consumption and said value of said actual ink consumption and to initiate a leakage alert upon ascertaining a difference between said values.

10. The device according to claim 9, wherein said workflow system calculates the theoretical amount of ink to be consumed by adding up volumes of ink drops from print heads of the printing machine based on the prepress image data.

* * * * *